US009563385B1

(12) United States Patent
Kowalski et al.

(10) Patent No.: US 9,563,385 B1
(45) Date of Patent: Feb. 7, 2017

(54) PROFILE-GUIDED DATA PRELOADING FOR VIRTUALIZED RESOURCES

(71) Applicant: Amazon Technologies, Inc., Reno, NV (US)

(72) Inventors: Marcin Piotr Kowalski, Cape Town (ZA); David R. Richardson, Seattle, WA (US); James Alfred Gordon Greenfield, Cape Town (ZA); Jacobus Johannes Nicolaas Van Der Merwe, Cape Town (ZA); Matthew James Eddey, Cape Town (ZA); Christopher Richard Jacques De Kadt, Cape Town (ZA); Peter Nicholas Desantis, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 288 days.

(21) Appl. No.: 14/028,186

(22) Filed: Sep. 16, 2013

(51) Int. Cl.
*G06F 3/06* (2006.01)
(52) U.S. Cl.
CPC ........... *G06F 3/0665* (2013.01); *G06F 3/0604* (2013.01); *G06F 3/0673* (2013.01)
(58) Field of Classification Search
None
See application file for complete search history.

(56) References Cited

U.S. PATENT DOCUMENTS

| | | | |
|---|---|---|---|
| 5,574,878 A | 11/1996 | Onodera et al. | |
| 6,463,509 B1 | 10/2002 | Teoman et al. | |
| 7,788,664 B1 * | 8/2010 | Janakiraman | G06F 9/45533 718/1 |
| 7,895,261 B2 | 2/2011 | Jones et al. | |
| 8,280,853 B1 | 10/2012 | Lai et al. | |
| 8,285,687 B2 | 10/2012 | Voll et al. | |
| 2002/0059253 A1 | 5/2002 | Albazz et al. | |
| 2003/0191930 A1 | 10/2003 | Viljoen et al. | |
| 2004/0078419 A1 | 4/2004 | Ferrari et al. | |

(Continued)

FOREIGN PATENT DOCUMENTS

WO 2011/088261 7/2011

OTHER PUBLICATIONS

"Copying an Amazon EBS Snapshot" Wikipedia—Archive Documentation. Captured by WayBack Machine on Dec. 31, 2012. Also available at <http://web.archive.org/web/20121231192757/http://docs.aws.amazon.com/AWSEC2/latest/UserGuide/ebs-copy-snapshot.html>.*

(Continued)

*Primary Examiner* — Midys Rojas
*Assistant Examiner* — Jane Wei
(74) *Attorney, Agent, or Firm* — Robert C. Kowert; Meyertons, Hood, Kivlin, Kowert & Goetzel, P.C.

(57) ABSTRACT

Methods and apparatus for profile-guided preloading for virtualized resources are described. A block-level storage volume whose contents are to be populated via data transfers from a repository service is programmatically attached to a compute instance. An indication of data transfers from the repository to a block storage service implementing the volume is obtained, corresponding to a particular phase of program execution at the compute instance. A storage profile is generated, based at least in part on the indication of data transfers. The storage profile is subsequently used to preload data from the repository service on behalf of other compute instances.

20 Claims, 9 Drawing Sheets

(56) References Cited

U.S. PATENT DOCUMENTS

| | | | |
|---|---|---|---|
| 2008/0140905 | A1 | 6/2008 | Okuyama |
| 2009/0228889 | A1 | 9/2009 | Yoshida |
| 2009/0249470 | A1 | 10/2009 | Litvin et al. |
| 2010/0037009 | A1 | 2/2010 | Yano et al. |
| 2010/0070725 | A1 | 3/2010 | Prahlad et al. |
| 2010/0191922 | A1 | 7/2010 | Dickey et al. |
| 2010/0312983 | A1 | 12/2010 | Moon et al. |
| 2012/0079221 | A1 | 3/2012 | Sivasubramanian et al. |
| 2012/0254687 | A1 | 10/2012 | Leggette et al. |
| 2013/0007753 | A1* | 1/2013 | Jain .............................. 718/103 |
| 2013/0046966 | A1 | 2/2013 | Chu et al. |
| 2013/0086585 | A1* | 4/2013 | Huang et al. ..................... 718/1 |
| 2013/0104126 | A1* | 4/2013 | Padmanabhuni et al. ........ 718/1 |
| 2013/0198459 | A1* | 8/2013 | Joshi et al. .................. 711/130 |
| 2014/0181046 | A1* | 6/2014 | Pawar ................ G06F 11/1484 707/654 |

OTHER PUBLICATIONS

Amazon S3 Storage Services Guide—Developer Guide (API Version Mar. 1, 2006). Can be accessed at <http://docs.aws.amazon.com/AmazonS3/latest/dev/Welcome.html>.*

Reich et al. "VMTorrent: Scalable P2P Virtual Machine Streaming". Dec. 10-13, 2012.*

SwinBrain. "Database Management System Introduction". Nov. 17, 2009. Also available at http://swinbrain.ict.swin.edu.au/wiki/Database_Management_Systems_Introduction.*

"Amazon EBS API and Command Overview", downloaded Jul. 11, 2013 from doc.aws.amazon.com/AWSEC2/latest/UserGuide/ebs-api-cli-overview.html, p. 1.

"AMI Basics" downloaded Jul. 11, 2013 from doc.aws.amazon.com/AWSEC2/latest/UserGuide/ComponentsAMIs.html, p. 1-2.

"AWS Amazon Elastic Block Store (EBS)—Persistent Storage" downloaded Jul. 11, 2013 from aws.amazon.com/ebs/, pp. 1-4.

"Cloudiquity" Published Mar. 12, 2009, Amazon Web Services and Cloud, pp. 1-4.

"Feature Guide: Elastic Block Store: Articles & Tutorials: Amazon Web Services" downloaded Jul. 11, 2013 from aws.amazon.com/articles/1667, pp. 1-7.

VMware; Carl Waldspurger; Memory Resource Management in WMware ESX Server; pp. 1-24, Dec. 10, 2002.

HP; Chris Hyser et al.; Autonomic Virtual Machine Placement in the Data Center; pp. 1-10, Feb. 26, 2008; HP Laboratories.

U.S. Appl. No. 12/892,742, filed Sep. 28, 2010, Swaminathan Sivasubramanian.

U.S. Appl. No. 13/465,998, filed May 7, 2012, Marc J. Brooker.

U.S. Appl. No. 13/424,290, filed Mar. 19, 2012, Marc J. Brooker.

U.S. Appl. No. 13/466,007, filed May 7, 2012, Marc J. Brooker.

U.S. Appl. No. 13/466,010, filed May 7, 2012, Marc J. Brooker.

U.S. Appl. No. 13/466,014, filed May 7, 2012, Marc J. Brooker.

U.S. Appl. No. 13/466,022, filed May 7, 2012, Marc J. Brooker.

* cited by examiner

PROFILE-GUIDED DATA PRELOADING FOR VIRTUALIZED RESOURCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems.

Some of the services implemented in large-scale provider networks may rely on other services. For example, it may be possible to store software stacks or images to be used by virtualized compute servers of a compute service, such as machine images used for booting the compute servers, or snapshots used to recover server state as of a desired point in time, at a storage repository service implemented by the same provider network. In some scenarios, the responsiveness of various types of operations as perceived by clients of the compute service may be impacted negatively due to latencies involved in inter-service data transfers.

Figure 1:
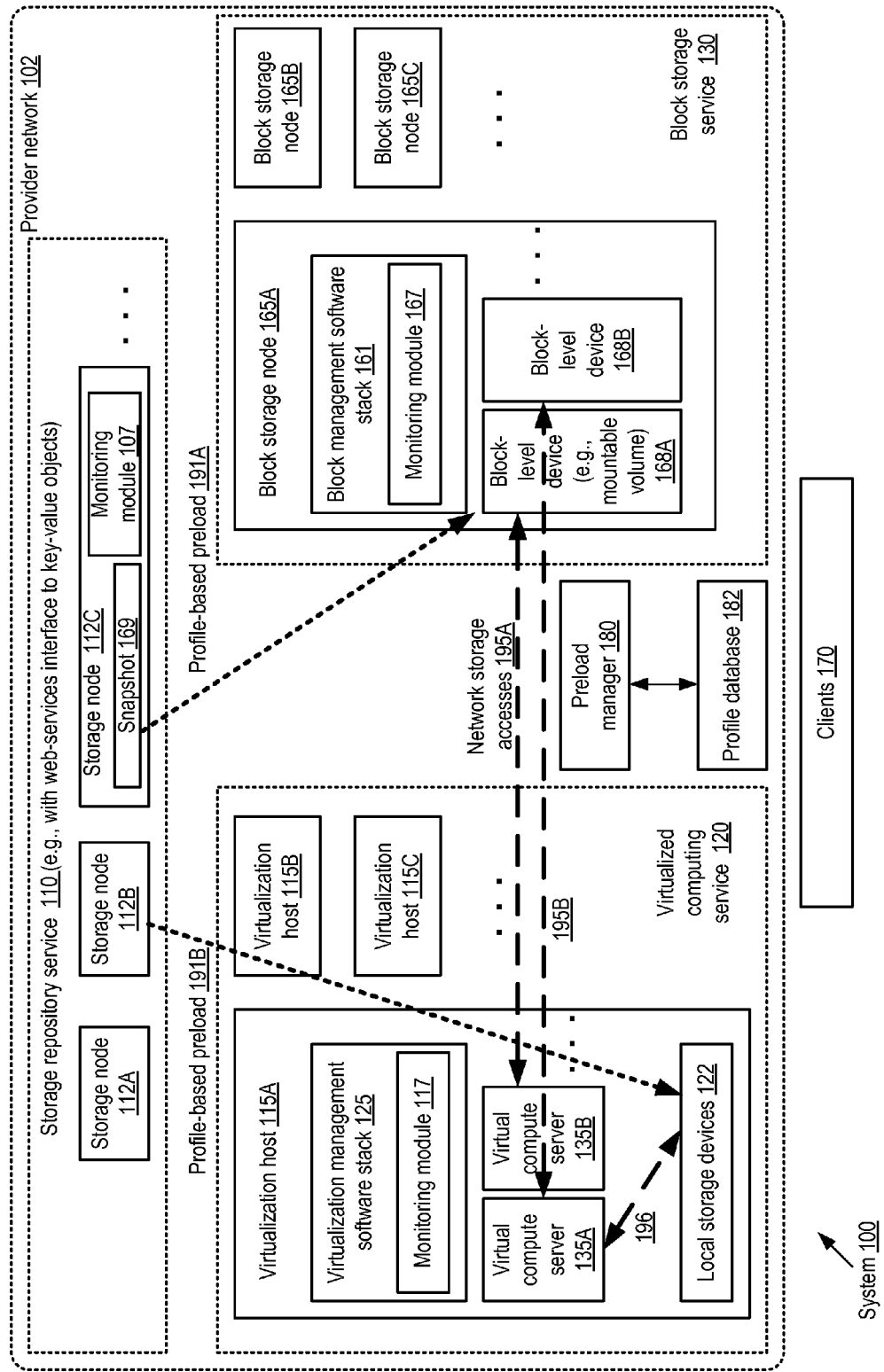
FIG. 1 illustrates an example of a system in which storage access profiles may be used to pre-load portions of data objects from a storage repository service for use at virtualization hosts, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Various embodiments of methods and apparatus for implementing profile-guided data preloading to speed up operations at compute resources of a provider network are described. Networks set up by an entity such as a company or a public sector organization to provide one or more network-accessible services (such as various types of cloud-based computing, storage or database services) accessible via the Internet and/or other networks to a distributed set of clients may be termed provider networks herein. In the remainder of this document, the term "client", when used as the source or destination of a given communication, may refer to any of the computing devices, processes, hardware modules or software modules that are owned by, managed by, or allocated to, an entity (such as an organization, a group with multiple users or a single user) that is capable of accessing and utilizing at least one network-accessible service of the provider network. A given provider network may include numerous data centers (which may be distributed across different geographical regions) hosting various resource pools, such as collections of physical and/or virtualized computer servers, storage servers with one or more storage devices each, networking equipment and the like, needed to implement, configure and distribute the infrastructure and services offered by the provider. A number of different hardware and/or software components, some of which may be instantiated or executed at different data centers or in different geographical regions, may collectively be used to implement each of the services in various embodiments.

In at least some provider networks, a network-accessible virtual computing service may be established, enabling clients to utilize virtualized compute servers (which may also be referred to as "compute server instances", "compute instances" or "virtual machines" herein) set up on their behalf at virtualization hosts managed by the provider network operator. A given virtualization host may comprise, at a given point in time, one or more compute instances, as well as a virtualization management software stack (e.g., a hypervisor and/or one or more administrative operating system instances). Pre-loading techniques described in further detail below may be used in various embodiments to proactively transfer data from one or more data repositories to block devices (e.g., boot volumes, or other block-level storage volumes) accessible from the compute instances, thus enabling various phases of operating system execution (such as boot sequences) and/or application execution (e.g., database initialization) to be speeded up According to some embodiments, a block storage service of the provider network may enable clients to create or instantiate block storage devices, such as mountable block-level volumes that implement block device programmatic interfaces for I/O, and to programmatically attach one or more block storage devices to compute instances to support networked block-level I/O operations (as opposed to, for example, file-level I/O operations) from the instances. In one embodiment, for example, the block storage service may expose a "CreateVolume" application programmatic interface (API), enabling clients to specify a volume size, as well as various other parameters such as a provisioned performance level to be supported by the block storage service (expressed in units such as block I/O operations per second). An "AttachVolume" API may be supported in such an embodiment to programmatically attach a specified volume to a specified compute instance with a specified device name. After a given volume implemented by the block storage service is attached to a compute instance, in some embodiments, the compute instance may interact with the volume just as it would interact with a local drive, e.g., formatting the volume with a file system and/or installing applications on the volume. Thus, the volumes provided by the block storage service may behave analogously to raw unformatted external hard drives from the perspective of the compute instances.

In at least some embodiments, clients of the block storage service may be able to generate point-in-time snapshots of their volumes programmatically, e.g., using a "CreateSnapshot" API. The point-in-time snapshot may be stored within a different storage service of the provider network in at least some embodiments, such as a storage repository service that exposes a web-services interface rather than a block device interface. A new volume may be created using an existing snapshot as the source (e.g., a "CreateVolume" call may specify a source snapshot) in some embodiments, and then attached to a desired compute instance, thus re-setting the state of the newly-attached volume's data as of the point in time that the snapshot was generated. The same snapshot may be used to create volumes for a plurality of compute instances in at least some embodiments. A number of other APIs to manage volumes and snapshots may be supported by the block storage service in various embodiments, such as DetachVolume, DeleteVolume, DescribeVolumes (to obtain configuration information regarding a specified set of volumes), DeleteSnapshot, CopySnapshot, and so on. It is noted that at least in some embodiments, a given snapshot used as a source for a volume may not necessarily represent a single point in time (i.e., not all snapshots need be point-in-time snapshots).

In some embodiments, some of the snapshot objects at the storage repository service may be used for root volumes of the compute instances, e.g., to boot up compute instances. Thus, in such embodiments, the software and configuration metadata needed to launch or start up a given compute instance (e.g., an instance that is to run a specified webserver W1 on an operating system O1) may be bundled into a snapshot stored at the repository. Such a snapshot may then be used to populate (i.e., instantiate the contents of various blocks of) a bootable volume implemented by the block storage service, which can then be used to boot up a compute instance with the desired configuration. In at least one embodiment, similar snapshots may also or instead be usable to populate bootable volumes at local storage devices at virtualization hosts, e.g., storage devices that are not managed by the block storage service.

When a compute instance is launched or started for the first time, the contents of its boot volume may have to be obtained from the repository service in at least some embodiments. Depending on the properties of the instance (such as the specific operating system and operating system version being used for the instance, the set of operating system services that are to be started up as part of the boot process, and so on), it may take a non-trivial amount of time to retrieve the contents of the boot volume. In at least some scenarios, it may be possible to predict, e.g., using results of monitoring obtained from other launches or boot sequences, at least some of the data units that are likely to be retrieved from the repository service, and the sequence in which those data units are likely to be accessed. Such predictions may be employed to pre-fetch data for, and thereby speed up, boot sequences in at least some embodiments, as described below. This type of prediction may be particularly useful when the same repository object (e.g., a particular snapshot to be used as a source for a bootable volume, or to restore a state of a compute instance as of a given point in time) is used for large numbers of different compute instances, or is used multiple times for the same instance. Similarly, monitoring-based predictions of the sequence in which data is read in from the repository service may also be useful for speeding up the performance of various phases of application execution, such as database initialization, warming up application caches, application shutdown phases, and the like.

According to at least some embodiments, a preload manager may be established to help coordinate the prefetching of data from a back-end repository service to populate the contents of block devices accessible from virtualized compute servers. Such a preload manager may itself be implemented using a plurality of distributed hardware and/or software components in some embodiments. The preload manager may be configured to obtain, corresponding to a particular phase of program execution at a particular compute instance, an indication of one or more data transfers from the object at the storage repository service to the block storage service. For example, any combination of monitoring agents set up, and/or logs written at, the block storage service itself, the virtualization hosts at which the compute instance is run, or the repository service may be utilized to track the data transfers. In some cases the particular phase may comprise the entire execution of one or more programs, one or more scripts, or a set of processes instantiated in response to one or more commands, while in other cases the boundaries of the phase may be defined by the preload manager. The phase of execution of interest, for which a storage access profile is generated, need not may comprise the entire execution of any given program, script or process in at least some embodiments. In one implementation, for example, the preload manager may use any of various log entries (e.g., the logical equivalents of "Boot completed", "Initialization complete", or "Cache loading complete") to define the boundaries of phases of interest. In some embodiments, a given program phase may be selected for profile generation based on various factors, such as the expected probability that an I/O request sequence of the phase is likely to be repeated by other instances, the random-versus-sequential mix of the I/O requests, the sizes of the I/O requests relative to the sizes of the corresponding data transfers required from the repository (which may impact the total I/O performance costs of the phase), and/or as a result of a profiling requests received from the program itself or from some other program or entity.

Based on the indications of the data transfers, in some embodiments a storage access profile corresponding to the particular phase of program execution may be generated and stored, e.g., in a database. A given record in such a database may comprise, in one embodiment, some combination of an identification of the operating system in use during the program execution, a machine image identifier for the particular machine image used for the instance, an identification of the program itself, an identification of the phase of the program, and identifiers of a set of data units (e.g., 4 KB data blocks, 512-byte data blocks, or 4 MB data chunks) accessed during the phase of program execution. In different embodiments, either physical identifiers of the data units, or logical identifiers (e.g., logical offsets) of the data units, or both physical and logical identifiers, may be used. The database itself may be stored in any of several types of data stores, such as the storage repository service, or local storage devices accessible from the preload manager.

After a storage access profile is generated and stored, it may be used to preload data from the repository service. For example, if the preload manager determines that the same phase of program execution (or a phase of program execution related to the particular phase) is going to occur at a different compute server instance of the provider network, and such a determination is made sufficiently early with respect to the time that the phase is executed, the preload manager may retrieve the contents of the profile from the database and determine a candidate set of data that could be preloaded for the phase of program execution. In some implementations, the preload manager may be configured to respond to explicit or implicit preload requests, e.g., from earlier phases of the program for which preload is to be attempted, or from other related programs or entities. In other implementations, the preload manager may itself be able to determine, e.g., based on a detected pattern of other programs/scripts that are typically invoked prior to the phase of interest, that operations for the preload should be initiated. It is noted that in at least some cases, the phase for which data is preloaded need not be identical to the original phase—e.g., it may be possible for the preload manager to determine similarities between two different programs or program execution phases P1 and P2, and use a profile generated based on monitoring data transfers of P1 to optimize I/O performance for P2. Some portion or all of a candidate set of data indicated by the profile may then be retrieved from the repository service to populate a block storage device or volume for the different compute server instance (or even for the same compute server instance). It may be the case, in at least some embodiments, that the original set of data at the storage repository service whose transfers were tracked to generate the storage access profile may have been moved, consolidated or rearranged since the profile was created, and as a result the location within the repository service of the preloaded data may differ from the original location. In such embodiments, the profile's information indicating the candidate set of data may be sufficient to identify the appropriate set of data to be transferred for preload purposes, even if the physical location of the data has changed—e.g., logical addresses may be used in the profile.

After the data has been preloaded, when the different compute server instance issues an I/O request, the corresponding I/O operations (which may include one or more reads and/or writes) may be performed using the preloaded data if possible, i.e., without accessing the repository service. It may be the case, for at least some program executions and some profiles, that the preloaded data may not be complete or sufficient—i.e., some of the actual I/O requests may differ from the predictions indicated in the profiles. In such scenarios, some of the I/O requests may still have to be satisfied from the repository service. In at least some embodiments, records of such "misses" or inaccuracies in the profiles may be collected over time. Such records may be useful to improve the profiles, e.g., using artificial intelligence techniques such as machine learning in some embodiments.

In at least some embodiments, the repository service may be configured to store key-value objects, i.e., with each object simply considered as an unstructured collection of bits identified by a key. As opposed to the block device interfaces implemented by the block storage service, in at least some embodiments the repository service may implement a web services API, so that, for example, clients of the repository service may store data directly to, and access data directly from, the repository service without requiring to attach or mount any devices, and without necessarily using compute instances of the provider network. In various embodiments, the provider network may support high data durability levels, for either the block storage service, the storage repository, or both. Various types of data replication techniques, such as full replication or erasure coding algorithms, may be used to ensure the desired data durability in different embodiments.

In at least one embodiment, the preload manager may be configured to select a subset of the data identified in a profile for preloading, instead of preloading the entire set of data indicated in the profile. For example, the preload manager may collect performance metrics such as current resource utilization levels at various portions of the provider network that may have a bearing on the preload operations, and decide based on the metrics that it may not be advisable to try to retrieve the complete data set. Instead, only a portion of the data set may be retrieved in such a scenario, or in some cases preloading may not be performed at all.

A plurality of compute instances may be able to benefit from the preloading of the same data set from the repository service in at least some embodiments, even if two different compute instances are not configurable to share the same volume. For example, consider a scenario in which compute instances I1 and I2 are each configured to be booted using the same source snapshot S1. I1 and I2 are located at respective virtualization hosts VH1 and VH2 at a data center DC1, while S1 is located at a different data center DC2. In some embodiments, the preload manager may be configured to set up a shared local storage cache LSC in the vicinity of the virtualization hosts VC1 and VC2, and preload data from the source snapshot S1 to LSC. The cache LSC may be implemented using any appropriate type of storage device in various embodiments. For example, in one implementation the cache may be implemented using a different volume attached to VH1 or VH2, a different volume attached to a different virtualization host, or using a local storage device, a network attached storage appliance in the same data center as VH1 and VH2, or a storage area network device in the same data center. Instead of transferring the data all the way from the repository service, the preload manager may more efficiently preload the data from the local cache in such embodiments. In some embodiments such a cache may be set up even if the store repository object is located in the same data center as the virtualization hosts—e.g., a storage device in a nearby rack, to which the latency from the virtualization hosts is smaller than the latency to the repository service node at which the snapshot is stored, may be used for the cache.

Example System Environment

FIG. 1 illustrates an example of a system 100 in which storage access profiles may be used for pre-loading portions of data objects from a storage repository service for use at virtualization hosts, according to at least some embodiments. As shown, system 100 comprises a provider network 102 in which several network-accessible services are implemented for service clients 170. Three examples of such network-accessible services are shown with respective sets of resources: a virtualized computing service 120, a block storage service 130, and a storage repository service 110.

Virtualized computing service 120 implements a plurality of virtual compute servers 135 in the depicted embodiment, such as virtual compute servers 135A and 135B. Virtual compute servers 135 may also be referred to as compute server instances, or compute instances, herein. Numerous virtualization hosts 115, such as hosts 115A, 115B and 115C, may be used for the virtual compute servers, and several virtual compute servers 135 may be hosted at a given virtualization host 115 in some embodiments. Each compute instance 135 may have its own instance of an operating system and an application stack, accessible to the client 170 to which the compute instance is assigned or allocated, and the operating systems (or versions) of different compute instances running on the same virtualization host may differ in at least some implementations. In addition to the virtualized compute servers 135, a virtualization host 115 may include a virtualization management software stack 125, comprising for example a hypervisor and/or one or more administrative instances of an operating system that may typically not be accessible by, or visible to, clients 170. A given virtualization host 115 may also have one or more local storage devices 122, e.g., disks that can be accessed from the virtual compute resources or the virtualization management software stack 125 without the use of a network link. Local storage devices may be managed by software at the virtualization host 115, e.g., without the help of the block storage service 130, in at least some embodiments. A number of programmatic interfaces may be implemented by the virtualized computing service 120, including various APIs and/or web-based consoles to create, launch, stop, restart, or delete compute instances.

Block storage service 130 may be configured to provide block level devices (such as mountable volumes, including boot volumes) for use by compute resources 135 in the depicted embodiment. The terms "block storage device", "block-level storage volume", and "volume" may be used synonymously herein, although in at least some implementations block storage devices other than volumes may be implemented. A plurality of block storage nodes 165 (such as nodes 165A, 165B and 165C) may be instantiated, with each node 165 comprising one or more block storage devices 168 (such as block storage devices 168A and 168B of node 165A). In at least some embodiments, clients may be able to manage block storage devices using a set of programmatic interfaces such as a "CreateVolume" API to create a mountable volume, a "DescribeVolume" API to retrieve metadata and properties of the, and so on. In addition to block storage devices 168, a given block storage node 165 may include a block management software stack 161 in at least some embodiments. After a block storage device is created, a client may invoke another programmatic interface (e.g., an "AttachVolume" API) to make the volume accessible to a specified compute instance over a network. In FIG. 1, for example, block storage device 168A is attached to virtual compute server 135B, enabling block-level network storage accesses 195A, while block storage device 168B is attached to virtual compute server 135A, enabling block-level network storage accesses 195B. In some embodiments, a plurality of block level devices or volumes may be attached to a given compute instance. In one embodiment, a given block level device or volume may only be attached to one compute instance, while in other embodiments, block level devices may be shared by multiple compute instances. After a given block storage device 168 is attached to a compute instance 135, the compute instance may interact with the volume just as it would interact with a local storage device 122, e.g., formatting the block storage device with a file system and/or installing applications directly on the "raw" volume without setting up a file system. Thus, the block storage service's devices 168 may be considered analogous to raw unformatted external hard drives from the perspective of the compute instances.

In at least some embodiments, clients of the block storage service 130 may be able to generate point-in-time snapshots (such as snapshot 169 shown at storage node 112C of the storage repository service 110) of their volumes programmatically, e.g., using a "CreateSnapshot" API. When a client invokes such a programmatic interface, the data stored in the volume as of the time of the invocation, as well as associated metadata, may be bundled into an object and saved at one or more nodes of storage repository service 110 in the depicted embodiment. The client may not necessarily be informed about the specific node 112 (e.g., node 112A, 12B or 112C) of the storage repository service at which the snapshot is stored in at least some implementations; instead, a snapshot identifier may be provided to the client, which may be used for further operations on the snapshot. In some implementations, it may be possible for a client to specify a specific destination for a snapshot, e.g., either at the storage repository service or elsewhere. A new volume may be created using an existing snapshot as the source (e.g., a "CreateVolume" call may specify a source snapshot) in some embodiments, and then attached to a desired compute instance, thus re-setting the state of the newly-attached volume's data as of the point in time that the snapshot was generated. The same snapshot may be used to create volumes for a plurality of compute instances in at least some embodiments. A number of other APIs to manage snapshots may be supported by the block storage service in various embodiments, such as DeleteSnapshot, (to remove a snapshot), CopySnapshot (to replicate a snapshot), DescribeSnapshot (to obtain metadata regarding a snapshot), and so on. In at least some embodiments, snapshots of bootable volumes may be created at the storage repository service nodes, and such snapshots may be used to populate new boot volumes attached to newly-created instances.

The storage repository service 110 may store data objects simply at the storage nodes 112 as collections of bits indexed by unique keys in some implementations. In other embodiments, more structured data models may be supported at the repository service. One or more web services-based programmatic interfaces may be implemented in some embodiments to allow clients (e.g., both external clients 170, and internal clients within the provider network 102 such as the block storage service 130 or preload manager 180) to access and manipulate objects of the repository service 110. In other embodiments, the repository service itself may also support block-level access to data objects. High levels of data durability and availability may be supported at the storage repository service and/or the block storage service using various types of replication techniques and encoding algorithms in various embodiments. For at least some of the block storage devices 168 implemented by the service 130 in the depicted embodiment, data may have to be populated or read in from the storage repository service 110—that is, the repository service may serve as the source or backing store for the block storage devices. In at least some embodiments, once a particular block storage device has been fully populated with data from the repository service, no further data transfers may be required from the repository service (at least in the absence failures), although data transfers to and from the repository service may still be performed (e.g., to create a new snapshot at client request).

In the depicted embodiment, each of the three illustrated services may comprise monitoring modules, such as monitoring modules 107 at storage nodes 112, monitoring modules 117 at virtualization hosts 115, and monitoring modules 167 at block storage nodes 165. The various monitoring modules 107, 117 and/or 167 may each be configurable to keep track of a variety of metrics, including for example the sequence of I/O requests and/or data transfer requests at their respective resources. In some embodiments, at least some of the resources at the various services may maintain respective logs (e.g., timestamped event logs or error logs), and the monitoring modules may be able to analyze such logs. In some implementations the logs may be accessible by other entities as well, such as by the preload manager 180. In one embodiment, each node or host used by a service may comprise a respective monitoring module, while in other embodiments, at least some nodes/hosts may not have their own monitoring modules. In some implementations, a given monitoring module 107, 117 or 167 may be configured to monitor several different service nodes or hosts.

Preload manager 180 may be configured to coordinate profile-based preloading of block storage devices in the depicted embodiment. It is noted that although the preload manager 180 is shown as a single entity in FIG. 1, its functionality may be implemented using a collection of hardware and/or software modules distributed within the provider network in at least some embodiments. The preload manager 180 may be responsible for monitoring (e.g. with the help of the monitoring modules 167, 107 and/or 117) data transfers between the storage repository service 110 and the block storage service 130 during various program execution phases. In some embodiments, the preload manager 180 may also be responsible for identifying program execution phases that are candidate for I/O optimization, including, for example, boot sequences of the compute instances, database initialization periods, or cache warmup periods of various applications, and then collecting monitored information regarding data transfers performed during such phases. The preload manager 180 may generate storage access profiles (e.g., based at least in part on the monitored data transfers), corresponding to the execution phases, and store the profiles within database 182. Each profile may include, among other entries, information (e.g., logical and/or physical identification or address information) about a sequence of data transfers from the repository service 110 in some embodiments. Further details regarding the contents of profile database 182 are provided below.

In addition to generating and storing the access profiles, preload manager 180 may also be configured to implement profile-based preloads in the depicted embodiment, as indicated by arrows 191A and 191B. For example, the preload manager may determine that a particular program execution phase is to occur at a given compute instance, and that a profile for that program execution phase (or for a similar or related program execution phase) is available in database 182. In such a scenario, the preload manager may access the profile from database 182, and use the profile's information regarding data transfers to identify a set of candidate data units (e.g., blocks or chunks, as described below in further detail) that may be preloaded to help speed up the anticipated execution phase. Depending on a number of factors, such as the resource utilization levels of the various service nodes and hosts and network paths between them, the preload manager 180 may determine whether the entire set of candidate data units should be transferred, or a subset should be transferred, or whether preloading should be avoided entirely. If a determination is made that at least a subset of one or more snapshots or other objects of the storage repository service 110 should be transferred to the block storage service, such transfers may be initiated (as indicated by arrow 191A) to populate the corresponding block storage devices or volumes. Subsequently, during the actual execution of the program for which the data was preloaded, I/O requests that target the preloaded set of data from the compute instance where the execution occurs may be satisfied from the proactively populated block storage devices, without incurring the delays that may otherwise have been required if the data had not been preloaded.

In at least some embodiments, such preload operations may also or instead be performed to proactively populate the local storage devices 122 at the virtualization hosts 115, as indicated by arrow 191B. That is, volumes set up at the local storage devices 122 (which may not have the same levels of data durability as the devices of the block storage service or the storage repository service) may be preloaded in a manner analogous to the technique used for preloading block storage devices 168. In at least some embodiments, a given virtual compute server 135, such as virtual compute server 135A, may access block storage devices that are implemented at local storage devices 122, as well as at the block storage service 130 (as shown by arrows 196 and 195B respectively). Accordingly, a given compute instance may be able to benefit from both the types of preloading indicated by arrows 191A and 191B in such embodiments.

The preload manager 180 may also be responsible in at least some embodiments for improving existing profiles stored in database 182 based on the results of preload operations over time, and/or of improving the decisions that influence the selection of subsets of the candidate data units for transfers. For example, the preload manager 180 may keep track of data misses and/or unnecessary transfers that occur despite its preload attempts, and using such records to enhance its operations using artificial intelligence techniques such as various machine learning algorithms. A data miss may be recorded if, for example, the preload manager transfers all the data indicated in a particular profile for a particular execution phase in the appropriate sequence, but the compute instance requests I/Os for data that is not indicated by the profile. Conversely, an unnecessary transfer may be identified if a preloaded unit of data is not actually accessed during the corresponding phase of program execution, It is noted that at least in some embodiments, clients of the provider network may not be provided direct visibility into the preload functionality—e.g., the preload features described herein may be performed without any explicit client requests for preload, or any explicit client-initiated preload configuration.

Preload Manager Components and Profile Database Entries

Figure 2:
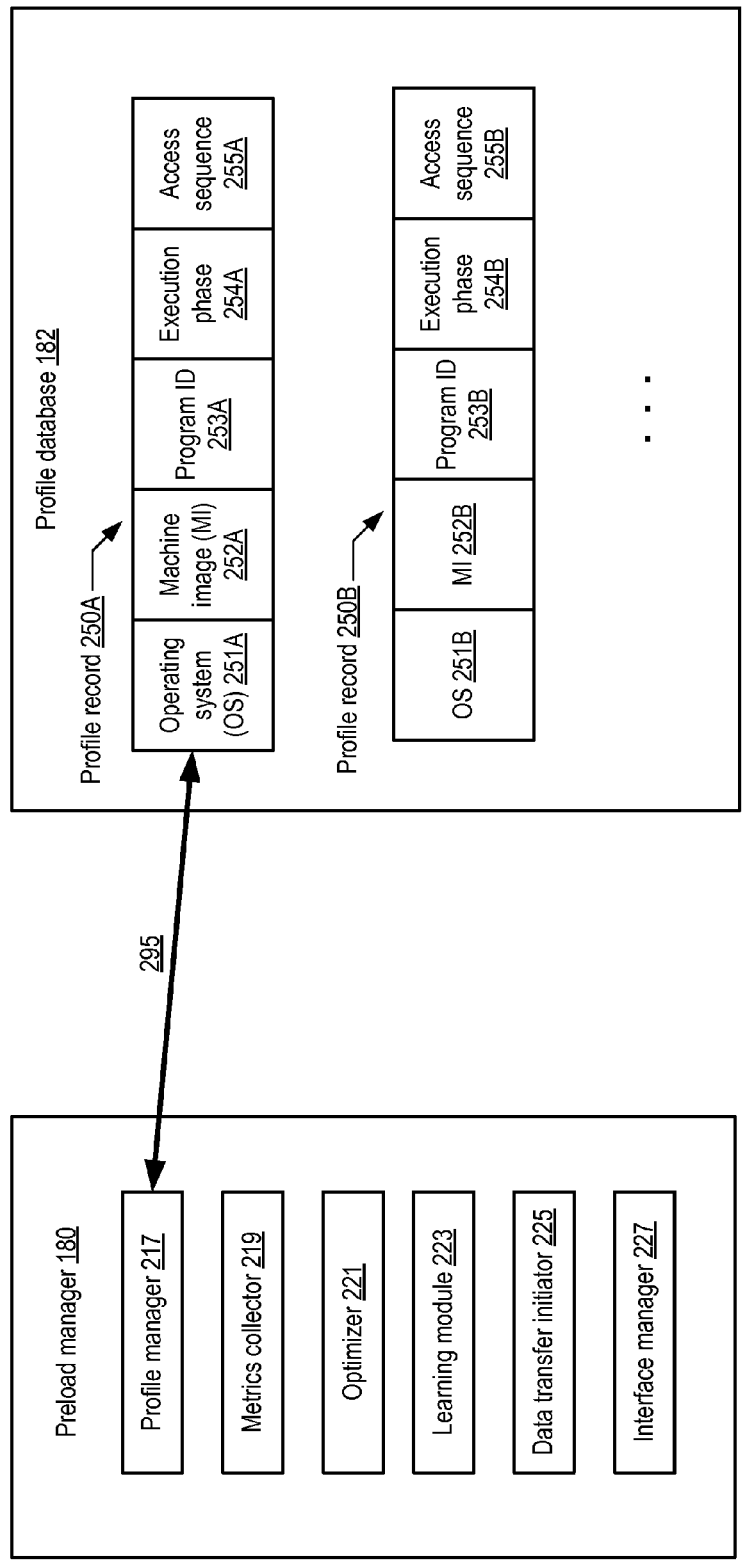
FIG. 2 illustrates example components of a preload manager, as well as example contents of storage access profile records, according to at least some embodiments.

FIG. 2 illustrates example components of a preload manager 180, as well as example contents of storage access profile records 250 (e.g., 250A and 250B), according to at least some embodiments. As shown, the preload manager 180 may include a profile manager 217, a metrics collector 219, an optimizer 221, a learning module 223, a data transfer initiator 225, and an interface manager 227 in the depicted embodiment. The interface manager 227 may be responsible for managing interactions between the other components of the preload manager and various other entities of the provider network 102. Thus, in some embodiments, the interface manager may implement and/or invoke various programmatic interfaces, e.g., to obtain administrative input from system administrators governing how aggressively the preload manager should pre-fetch data, or to extract monitoring data from monitoring modules 107, 117 or 167.

The profile manager 217 may be responsible for generating and storing the storage access profile records 250 in database 182 in the depicted embodiment (as indicated by arrow 295), e.g., using input regarding data transfers between the storage repository service 110 and the block storage service 130 from the metrics collector 219. A given storage access profile record 250 may include any combination of the following types of information in the depicted embodiment: the operating system type and version 251 in use at the compute instance at the time the data transfers were monitored (e.g., operating system information 251A of record 250A, and operating system information 251B of record 250B), the particular machine image 252 used to launch the compute instance (e.g., MI 252A or 252B), an identification 253 of the particular program (e.g., program ID 253A or program ID 253B) being executed at the time the data transfers were monitored, an identification of the phase 254 of execution of the program (e.g., 254A or 254B), as well as the access sequence 255 (e.g., 255A or 255B). It is noted that not all the elements of records 250 may need to be populated in at least some implementation—e.g., for a boot sequence, the program ID may be left blank or null in some implementations. In various implementations, the access sequences 255 may be expressed using different data transfer units. E.g., in some embodiments in which data transfers to/from the repository service are performed in larger units (which may be termed chunks, as described below) than block sizes, the sequence may be expressed in chunks, while in other implementations, the sequence may be expressed in blocks. Examples contents of a profile record 250 may comprise, for example, the tuple {"XYZ Operating System V5.3.2", "ABC MI-2013-07-01", "Null", "Boot sequence", "chunk123-chunk547-chunk678 . . . "} or {"LMN Operating System V6.2", "GH MI-2013-06-15", "Database DBX.4.3.2", "DB-Init", "block003-block5422-block678 . . . "}. It may be the case, in at least some embodiments, that the original set of data at the storage repository service whose transfers are tracked to generate the storage access profile may move (i.e., change physical addresses) over time—e.g., due to object rearrangement at the storage repository service, defragmentation-type operations, changes in the physical storage devices, or the like. In such embodiments, the access sequence may include sufficient information (e.g., logical addresses or offsets, instead of or in addition to physical addresses) to retrieve the appropriate set of data during preload. The profile manager 217 may also be responsible for retrieving profiles from the database as needed, e.g., using indexes that may be set up for the different elements of the records. Any appropriate database system may be used for the profile database in various embodiments, including relational, non-relational, spreadsheet-based, or object database management systems.

Metrics collector 219 may be responsible for collecting, aggregating and analyzing metrics from various sources in the depicted embodiment, e.g., to provide inputs for profile generation as well as to help make decisions regarding the actual amount of data to be preloaded for a given program execution phase (which may differ from the data indicated in the block access sequence of the profile being used, depending on current workload conditions in various parts of the provider network). Metrics collector 219 may communicate with monitoring modules 107, 117, and/or 167, as well as with other monitoring components associated with networking and/or computing resources of the provider network. Optimizer 221 may be the entity responsible for deciding, given a candidate set of data that can be preloaded in accordance with a profile, the actual subset of the data (which could be the entire data set) that will be preloaded. The optimizer may use input provided by the metrics collector 219, for example, in making its real-time decisions. Learning module 223 may be configured to utilize various artificial intelligence techniques, such as machine learning approaches, to improve the profiles over time (e.g., based on records of misses and unnecessary transfers described above). Data transfer initiator 225 may be responsible for issuing the read requests to the storage repository service to populate the block storage devices 168 and/or local storage devices 122.

Data Access Sequences

Figure 3:
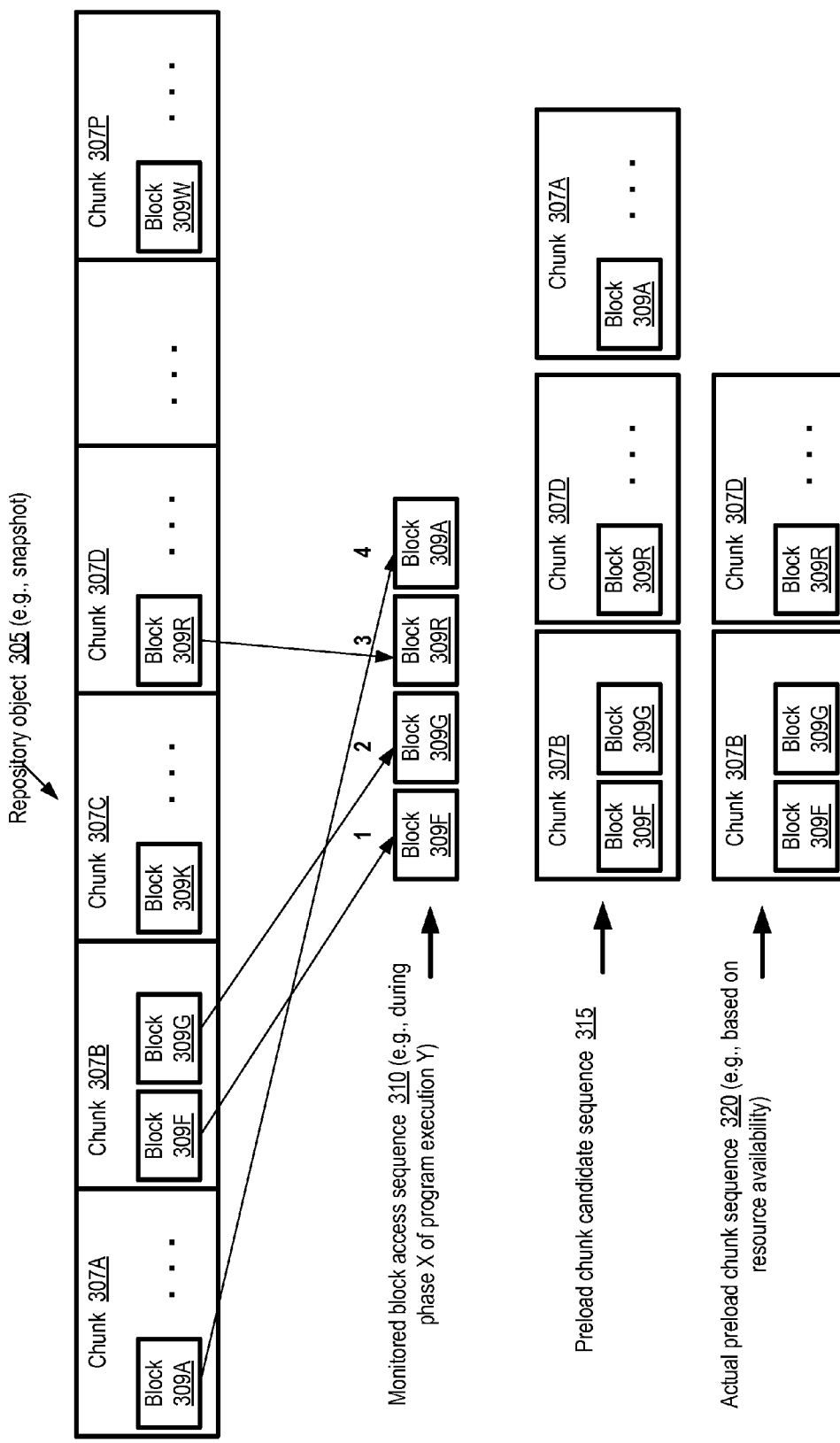
FIG. 3 illustrates an example use of a technique for determining a sequence in which data chunks are to be pre-loaded, according to at least some embodiments.

In at least some embodiments, the units of data transfers to and from the storage repository service may differ from the units (i.e., the block size) in which data is read and written by the compute server instances. For example, in one implementation, data transfers to/from the repository service may be performed in multiples of four-megabytes, while the block size used for accessing volume contents may be four kilobytes or even 512 bytes. Data may be transferred in larger units than typical block sizes to reduce networking overhead, for example. The units of data transfer to and from the repository service may be referred to as "chunks" herein. When creating and using profiles, the preload manager may have to take the mappings between the I/O requests issued from the compute instances and the chunks of the storage repository service objects into account. FIG. 3 illustrates an example use of a technique for determining a sequence in which data chunks are to be pre-loaded, according to at least some embodiments.

As shown, a repository object 305 (such as a snapshot) may comprise a plurality of chunks 307, such as chunks 307A, 307B, 307C, 307D, . . . , 307P, each of which may in at least some implementations comprise a plurality of data blocks. Thus, in the depicted example, chunk 307A includes at least block 309A, chunk 307B includes blocks 309F and 309G, chunk 307C includes block 309K, chunk 307D includes block 309R, and chunk 307P includes block 309W. During an execution phase X of a program Y that has been identified as a candidate for preloading, the blocks may be accessed (e.g., read and/or written) in any order—that is, blocks need not be accessed in the order in which they are stored. As shown, the monitored block access sequence 310 may include (in order) blocks 309F, 309G, 309R and 309A, for example.

A preload chunk candidate sequence 315 may be constructed in the depicted embodiment, selecting the containing chunks for the blocks of the block access sequence. In the example of FIG. 3, the preload chunk candidate sequence may comprise chunks 307B and 307D followed by 307A. This preload chunk candidate sequence may be stored (e.g., using either physical addresses, logical addresses, or both) as the access sequence entry in the profile record 250 corresponding to execution phase X of program Y in the profile database 182. As noted earlier, in some implementations the block access sequence rather than the chunk candidate sequence may be stored in the profile record, in which case block-to-chunk translation may be required when during preloading. In some implementations, both the block access sequence and the chunk candidate sequence may be stored in the database 182.

When the preload manager decides to implement preloading for an anticipated execution of phase X, it may look up the profile record 250 in the database 182 and determine the contents of the access sequence. However, in at least some embodiments, not all the chunks (or blocks) that are candidates may be transferred to the block storage service. For example, the preload manager (e.g., its optimizer component) may also be aware of network conditions and/or other metrics indicating the current workload levels at various entities whose workload may be increased by the preload operations. Accordingly, if for example the preload manager realizes that preloading all the candidate chunks may overburden some resources, a subset of the candidates may be transferred, as indicated by the actual preload sequence 320 (which includes candidate chunks 307B and 307D, but does not include candidate chunk 307A). In some implementations the preload manager may optionally add delays between requests for different chunks if overload is a possibility, so that the additional work associated with preload is spread over time, or may decide to abandon preload for phase X.

In embodiments in which the difference between block sizes and chunk sizes is substantial, it may be the case that for some types of data access patterns during application phases of interest, a lot of redundant data may be preloaded (e.g., if the blocks that are accessed during the execution phase are sparsely mapped to the chunks). In some such embodiments, the preload manager may be configurable to reorganize a storage repository object 305, e.g., by consolidating the blocks of the block access sequence into fewer total chunks. When deciding whether to perform such reorganizations, the preload manager may take various factors into account in different embodiments, including for example the frequency with which the affected preload operations are performed, the improvement such a reorganization would result in, and possible side effects (e.g., other phases of program execution may be affected negatively).

Shared Caches in the Proximity of Virtualization Hosts

Figure 4:
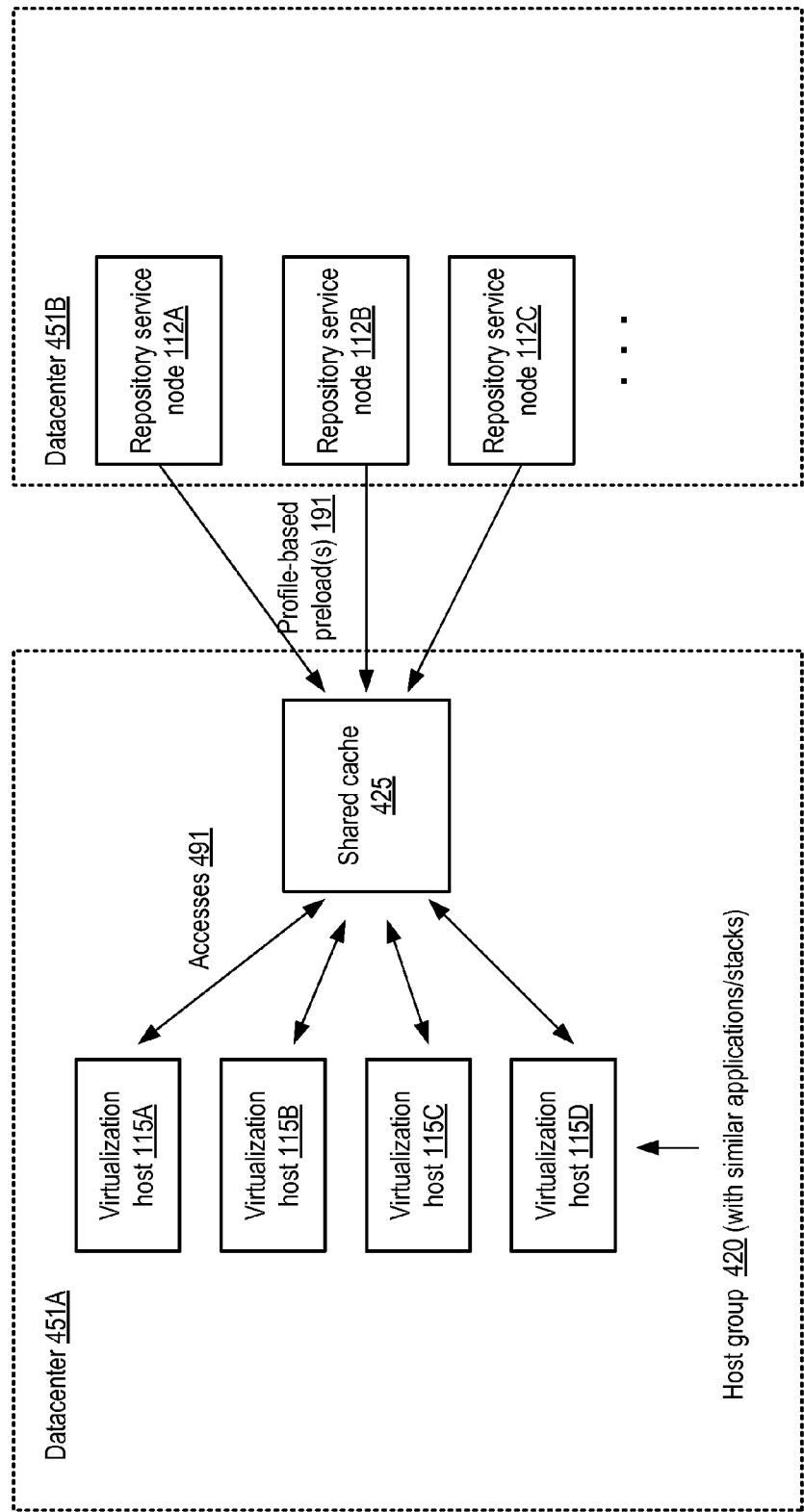
FIG. 4 illustrates an example of a use of a shared storage cache accessed by a plurality of virtualized hosts, according to at least some embodiments.

In some embodiments, it may be possible to share preloaded data retrieved from the repository service among a plurality of program executions at different compute servers using a nearby storage cache. FIG. 4 illustrates an example of a use of a shared storage cache accessed by a plurality of virtualized hosts, according to at least some embodiments. As shown, in the depicted embodiment a plurality of virtualization hosts 115A-115D, each with their respective set of compute instances, may be located in a particular data center 451A. If the compute instances of the depicted virtualization hosts are configured to implement related applications (e.g., similar applications run on behalf of a single client) and/or comprise similar software stacks, the virtualization hosts may collectively be termed a "host group" 420. Storage repository service nodes 112 (e.g., 112A, 112B and 112C) containing objects whose contents may be used to populate volumes attached to the compute instances of the host group may be located in a different data center 451B.

In some such scenarios, the preload manager 180 may configure a shared storage cache 425, comprising one or more storage devices to which the data access latency from the volumes is less than the latency to the storage repository service nodes 112 in the data center 451B, to store preloaded chunks or blocks retrieved from the repository service. The shared storage cache may itself comprise one or more block devices in some embodiments, e.g., one or more large volumes attached to one of the virtualization hosts 115 may be used as a cache. Such a shared storage cache may be especially useful in cases in which a small number of snapshots is going to be used to populate numerous volumes in the same data center over some relatively short time period, e.g., when a client requests a thousand instances be placed in a state corresponding to a specified snapshot. The preload manager may maintain shared cache 425 for some time, and then release its storage for other purposes once the volumes have all been populated. In some embodiments, shared caches may be set up even if the compute instances on the virtualization hosts do not have similar applications or software stacks.

Methods for Implementing Preloading

Figure 5:
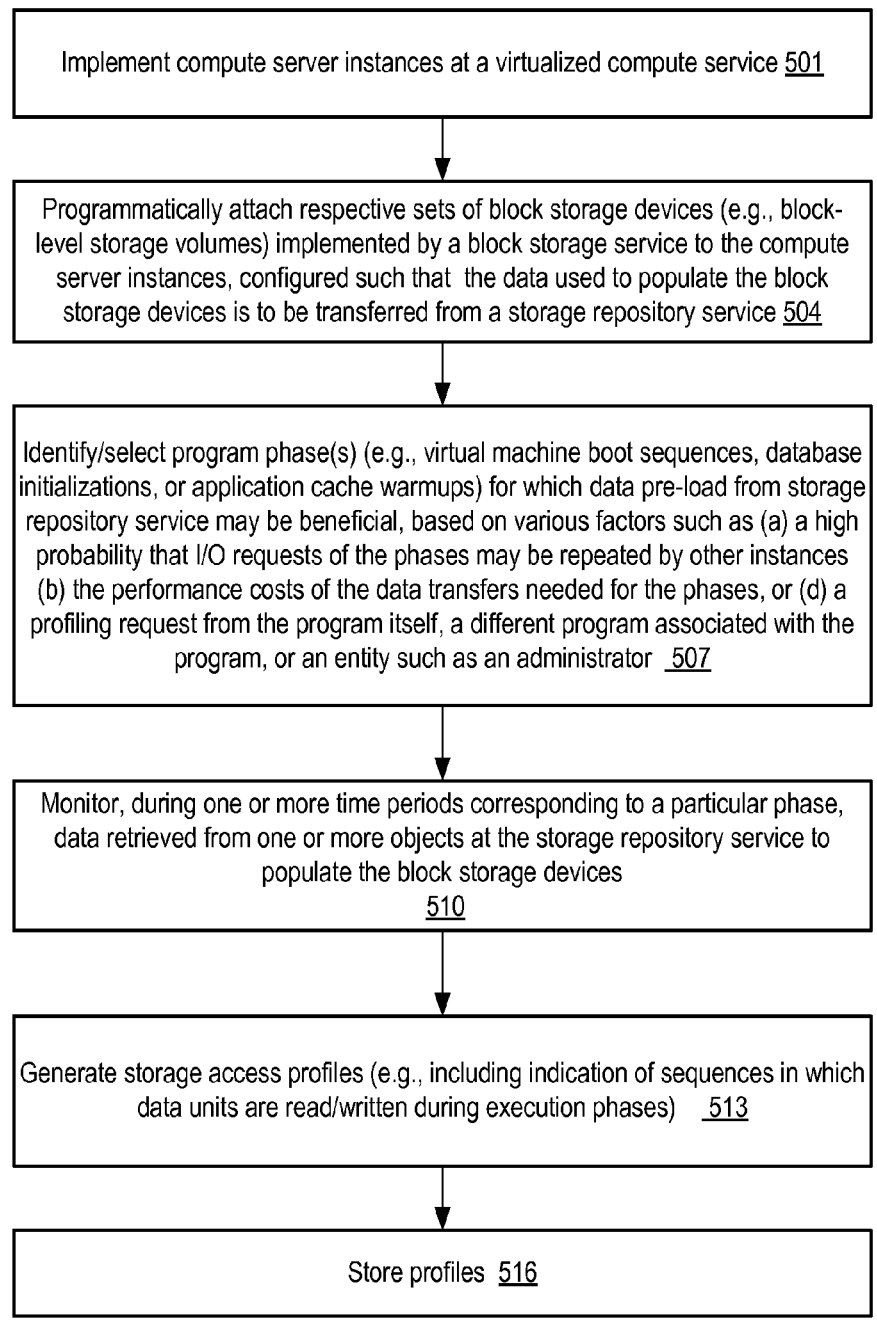
FIG. 5 is a flow diagram illustrating aspects of operations that may be performed to generate storage access profiles, according to at least some embodiments.

FIG. 5 is a flow diagram illustrating aspects of operations that may be performed to generate storage access profiles, according to at least some embodiments. As shown in element 501, a plurality of compute server instances may be implemented at a set of virtualization hosts of a provider network. Respective sets of block devices or volumes may be programmatically attached to the compute server instances (element 504). The block devices may be configured such that at least a portion of the data that is to populate the block device is to be retrieved or transferred (at least initially) from a storage repository service.

A number of phases of program execution that may benefit from pre-loading data from the repository service may be identified (element 507). Candidates suitable for pre-loading may include, for example, boot sequences, database or other application initialization phases, application cache warmup phases, or other phases in which a substantial amount of predetermined or static data is to be transferred from the repository service. In some cases the phase may even comprise the entire execution of a program, a script, or a set of processes instantiated in response to a command; in other cases the boundaries of the phase may be defined by the preload manager (e.g., based on log file entries such as "boot complete" or "initialization complete") and the phase may comprise less than the entire execution. In some embodiments, the preload manager 180 may be configured to identify such phases, e.g., based on the timings of various operations, and/or based on monitoring feedback received from clients. In some implementations, service-level agreements for various types of instances and/or applications may drive the identification of candidates for pre-loading. In at least some embodiments, a program phase may be selected for profile generation based on any combination of several factors, such as (a) a determination that the phase comprises a sequence of I/O requests expected to be repeated, with a probability above a threshold level, by one or more other compute instances, (b) a determination of performance costs associated with data transfers from the object at the storage repository service to satisfy I/O requests during the phase, or (c) a profiling request. In some implementations, the performance costs may represent an amplification of I/O-related data traffic caused by the fact that the units (e.g., the chunks shown in FIG. 3) in which data is transferred to and from the storage repository may be larger than the units (such as the blocks shown in FIG. 3) in which I/Os are requested during the program phase. I/O-related performance costs may also be amplified by the random nature of the accesses in some scenarios, as also illustrated in FIG. 3. In at least some embodiments, program phases may be selected for profile generation based on explicit requests sent to a profile manager 180, e.g., by the program itself, by a related program or script (e.g., a parent program/script that invokes or prepares for the program whose phase is to be profiled), or by an entity such as an administrator or a client on whose behalf the program is executed. Thus, in some embodiments and for some programs, the preload manager may independently identify the specific program phases to be profiled, while in other cases the selection of the program phases may involve collaboration between the preload manager and other programs/entities.

Data transfers between the repository service and the block storage service corresponding to the phases of execution of interest may then be monitored (element 510). In some cases, the sequence of accesses may differ from one run of a program to another (especially in the case of executions involving multiple processes or threads). Accordingly, multiple runs or instantiations of the same phase of program execution may be monitored over time, and a statistical technique may be applied to arrive at a representative set of accesses. Storage access profiles may then be generated for at least some of the phases of execution, each including a list or sequence of accesses (including reads and/or writes) together with other metadata (element 513). The access sequences may be indicated using logical addresses, physical addresses, or both in various embodiments. The profiles may then be stored (element 516), e.g., into any appropriate type of database such as one structured in a manner similar to that shown in FIG. 2.

Figure 6:
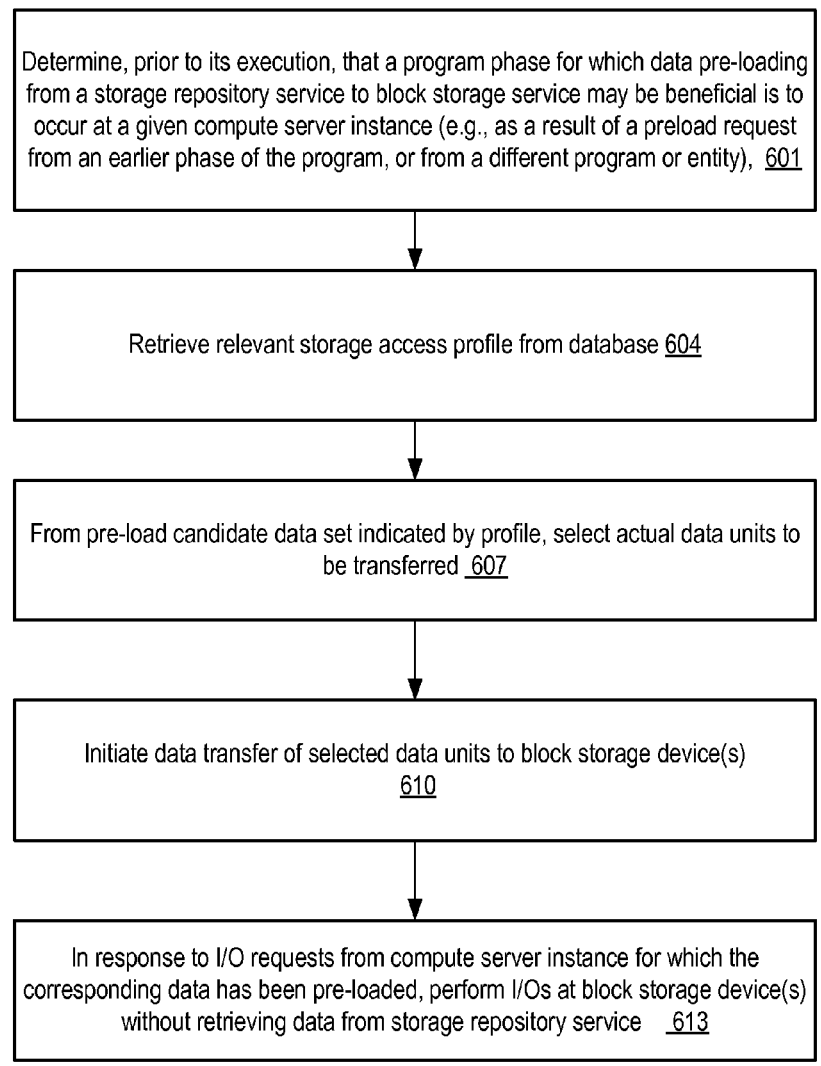
FIG. 6 is a flow diagram illustrating aspects of operations that may be performed to preload data into block storage devices in accordance with storage access profiles, according to at least some embodiments.

FIG. 6 is a flow diagram illustrating aspects of operations that may be performed to preload data into block storage devices in accordance with storage access profiles, according to at least some embodiments. As shown in element 601, a determination may be made that a phase of program execution that could benefit from a pre-load operation transferring data from the storage repository unit (e.g., the same phase of program execution from which the profile was generated, or a related phase anticipated to have similar I/O access patterns) is to occur. To obtain the full benefit of the pre-load, the determination may be made at some time prior to execution of the phase, e.g., some number of minutes or seconds prior to the execution. In some embodiments, for example, in which client requests for various types of operations are received via invocations of programmatic interfaces, the invocation of a particular programmatic interface may serve as an indication that a preload candidate execution phase is likely to begin soon. In some such embodiments, a notification mechanism (such as a listener mechanism) associated with such invocations may trigger the preload manager to begin a preload operation. In some embodiments, a pre-load request may trigger the retrieval of the profile and the initiation of the data transfers—for example, a precursor phase or parent program/script associated with the phase for which preloading is to be implemented may submit such a request, or an entity such as an administrator or client may submit such a request. As shown in element 604, upon making a determination regarding an imminent (or already started) candidate execution phase, the preload manager may retrieve the corresponding profile record from the profile database.

The candidate pre-load data set (e.g., the sequence of blocks or chunks indicated in the profile record) may then be identified in the depicted embodiment In some cases, the preload manager may take current workloads and/or resource utilizations (e.g., network path congestion between the storage repository nodes and the block storage service nodes) into account when determining the actual data units to be transferred (element 607). The data transfer of the selected data units may then be initiated (element 610). Subsequently, I/O requests from the executing program directed to the pre-loaded data may be satisfied without accessing the storage repository service (element 613).

Figure 7:
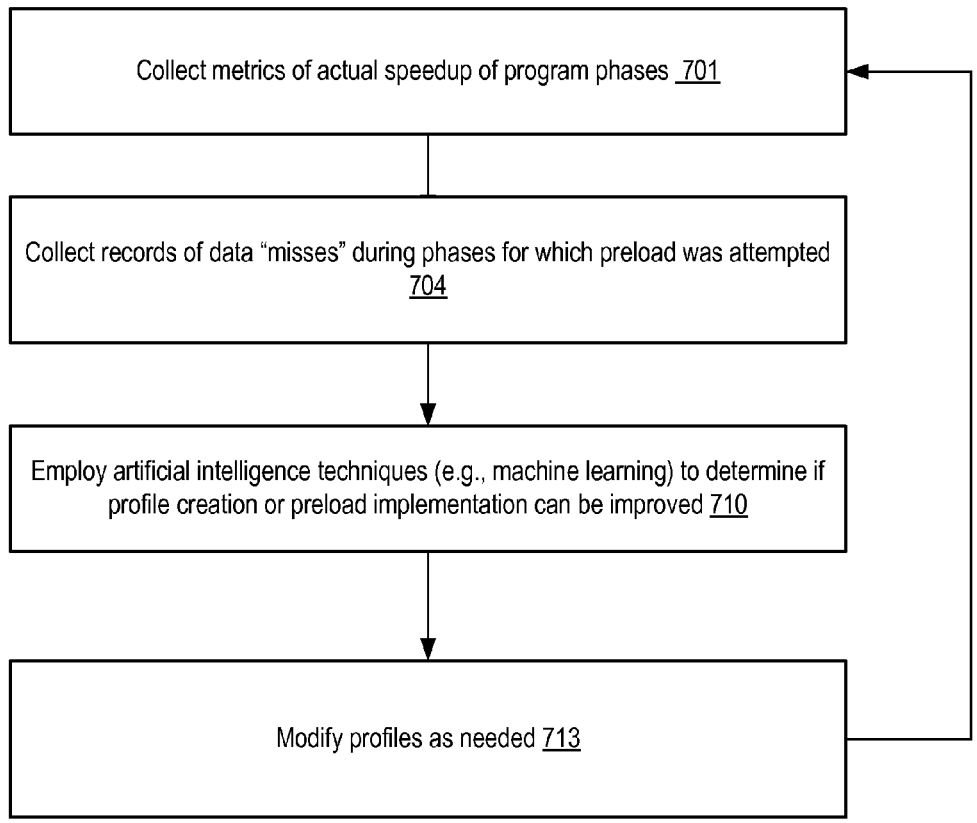
FIG. 7 is a flow diagram illustrating aspects of operations that may be performed to improve preloading techniques over time based on analysis of collected metrics, according to at least some embodiments.

FIG. 7 is a flow diagram illustrating aspects of operations that may be performed to improve preloading techniques over time based on analysis of collected metrics, according to at least some embodiments. As shown in element 701, metrics regarding the actual speedup of execution phases for which preloading is performed may be collected, e.g., over some weeks or months. Records of data "misses" (i.e., data units that did not get pre-loaded and had to be retrieved from the storage repository service) during such executions may also be collected (element 704).

One or more artificial intelligence techniques (such as machine learning techniques) may be implemented in the depicted embodiment to determine if profile creation or other aspects of the preloading process (e.g., the real-time decisions regarding whether the entire set of candidate data units should be preloaded, or only a subset) can be improved (element 707). Depending on the results of the artificial intelligence techniques, the profiles and/or the preload methodology may be modified (element 710). The monitoring and evaluation process may then be repeated for the next time interval (i.e., the operations corresponding to elements 701 onwards may be repeated).

Figure 8:
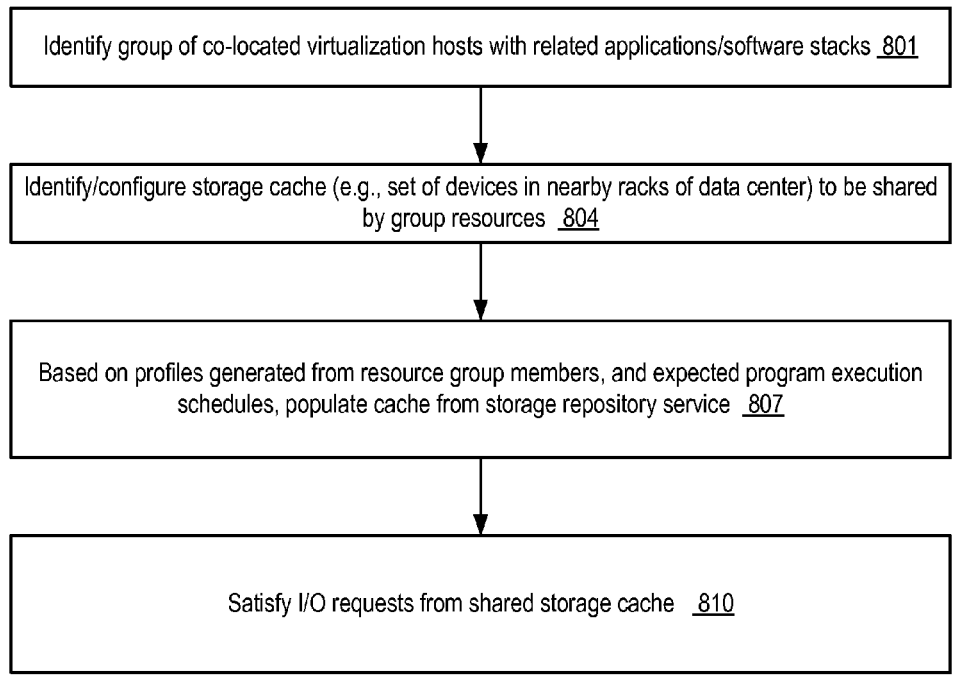
FIG. 8 is a flow diagram illustrating aspects of operations that may be performed to share pre-loaded data among a plurality of virtualization hosts, according to at least some embodiments.

FIG. 8 is a flow diagram illustrating aspects of operations that may be performed to share pre-loaded data among a plurality of virtualization hosts, according to at least some embodiments. A group of co-located virtualization hosts with related applications and/or software stacks (e.g., installed software) may be identified (element 801), e.g., within a particular data center. A storage cache that can be shared among the group members, comprising for example one or more storage devices located at racks near the group of hosts, may then be identified (804).

The shared cache may then be populated with appropriate data from the storage repository service (element 807), e.g., based on profiles associated with the virtualization hosts that form the group and/or based on expected program execution schedules. In at least some embodiments, the cache may be preloaded even if the program execution is not imminent—e.g., if the preload manager anticipates that a particular number of instances are probably going to be booted using a boot volume derived from the same snapshot during the next few days, the snapshot contents may be preloaded. During the execution phases corresponding to the preloaded data, at least some of the I/O requests from the instances may be satisfied from the cache (element 810).

It is noted that in various embodiments, operations other than those illustrated in the flow diagrams of FIGS. 5, 6, 7 and 8 may be implemented to support preloading operations, and that some of the operations shown may not be implemented, or may be implemented in a different order or in parallel rather than sequentially.

Use Cases

The techniques described above, of pre-loading portions of data objects from a repository service to populate block-level storage devices, may be useful in a variety of different scenarios. For example, in many large provider networks with numerous data centers spread geographically, the latencies associated with retrieving substantial amounts of data from storage repository service nodes may be quite large. Furthermore, such latencies may vary substantially, depending on exactly where the affected compute instances are hosted. As the sizes of application data sets grows, and as operating systems grow more sophisticated, the amount of data that has to be read in from a repository service during initialization and/or boot phases is likely to increase as well. Reducing the absolute time it takes, and/or the variation in the time it takes, to boot an instance, or to initialize an application, may help to increase customer satisfaction for provider network operators.

Illustrative Computer System

Figure 9:
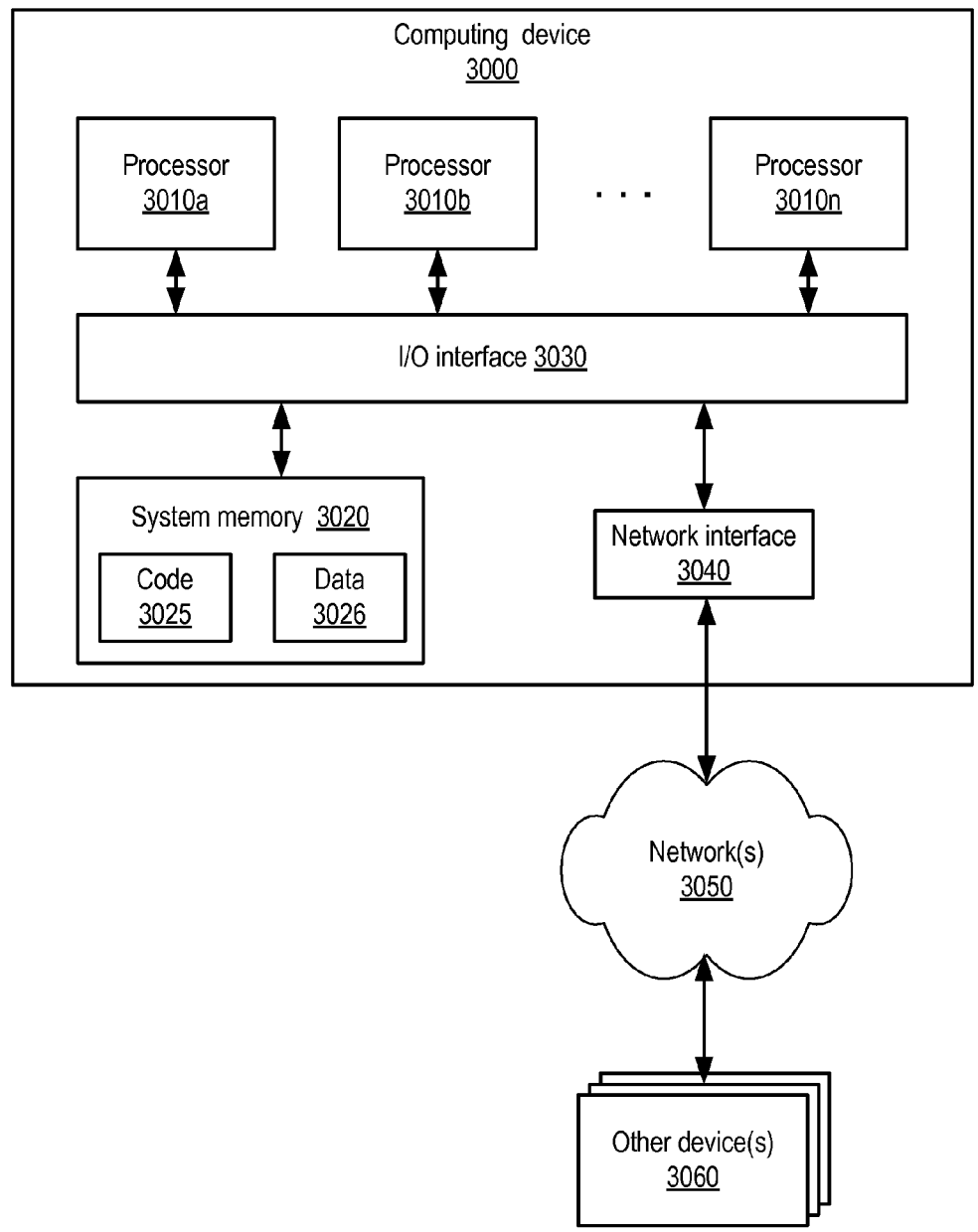
FIG. 9 is a block diagram illustrating an example computing device that may be used in at least some embodiments.

In at least some embodiments, a server that implements a portion or all of one or more of the technologies described herein, including the techniques to implement preload managers, profile databases, monitoring modules, storage repository service nodes, block storage service nodes, and/or virtualization hosts, may include a general-purpose computer system that includes or is configured to access one or more computer-accessible media. FIG. 9 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces such as various types of persistent and/or volatile storage devices used to store physical replicas of data object partitions. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    one or more computing devices configured to:
        implement a plurality of compute instances at a virtualized compute service of a provider network, wherein a block-level storage volume implemented at a block storage service of the provider network is programmatically attached for block-level network access by a particular compute instance of the plurality of compute instances, and wherein, in response to one or more block-level I/O requests to the block-level storage volume from the particular compute instance, data is transferred from an object at a storage repository service of the provider network to populate the block-level storage volume prior to at least a portion of the data then being provided from the block-level storage volume to the particular compute instance in response to the one or more block-level I/O requests;
        obtain, corresponding to a particular phase of program execution at the particular compute instance, an indication of one or more data transfers from the object at the storage repository service to the block storage service;
        generate, based at least in part on the indication of the one or more data transfers, a storage access profile associated with the particular phase at the particular compute instance;
        store the storage access profile;
        in response to a determination that the particular phase of program execution is to occur at a different compute instance of the provider network,
            identify at least a portion of an object indicated by the storage access profile to be pre-loaded to populate a different block-level storage volume attached to the different compute instance, wherein the storage access profile generated based on the particular phase of program execution at the particular compute instance is used to identify the portion of the object to be pre-loaded to the different block-level storage volume attached to the different compute instance; and
            transfer the at least a portion of the object to the different block-level storage volume.

2. The system as recited in claim 1, wherein the storage repository service comprises a key-value store configured to store unstructured data objects accessible via a web-services interface.

3. The system as recited in claim 1, wherein the one or more computing devices are further configured to:
    select the particular phase for profile generation based at least in part on one or more of: (a) a determination that the particular phase comprises a sequence of I/O requests expected to be repeated, with a probability above a threshold level, by one or more other compute instances, (b) a determination of performance costs associated with the one or more data transfers from the object at the storage repository service, or (c) a profiling request.

4. The system as recited in claim 1, wherein the object indicated by the storage access profile comprises a volume snapshot generated in response to a client request.

5. The system as recited in claim 1, wherein the one or more computing devices are further configured to:
    in response to a determination that an I/O request from the different compute instance during the particular phase of program execution cannot be satisfied from the pre-loaded portion of the object,
        store a record of the determination that the I/O request could not be satisfied; and
        modify the storage access profile based at least in part on the record.

6. A method, comprising:
    performing, by one or more computing devices:
        programmatically attaching a block-level storage volume implemented at a block storage service of a provider network to a particular compute instance of a virtualized compute service, wherein, in response to one or more block-level I/O requests to the block-level storage volume from the particular compute instance, the block storage service is configured to transfer data from an object at a storage repository service of the provider network to populate the block-level storage volume;
        obtaining, corresponding to a particular phase of program execution at the particular compute instance, an indication of one or more data transfers from the object at the storage repository service to the block storage service;
        generating, based at least in part on the indication of the one or more data transfers, a storage access profile associated with the particular phase at the particular compute instance, to be used to pre-load data from the object at the storage repository service on behalf of one or more other compute instances different from the particular compute instance; and
        storing the storage access profile.

7. The method as recited in claim 6, further comprising:
    determining that a phase of program execution related to the particular phase is to occur at a different compute instance of the provider network;
    identifying at least a portion of an object indicated by the storage access profile to be pre-loaded to populate a different block-level storage volume attached to the different compute instance; and
    transferring the at least a portion of the object indicated by the storage access profile to populate the different block-level storage volume.

8. The method as recited in claim 6, further comprising performing, by the one or more computing devices:

implementing, at the storage repository service, a web services programmatic interface to provide access to the object.

9. The method as recited in claim 6, wherein the particular phase comprises a boot sequence of the particular compute instance.

10. The method as recited in claim 6, wherein the particular phase comprises a phase of execution of an application program.

11. The method as recited in claim 10, wherein the application comprises a database management system.

12. The method as recited in claim 6, wherein the object indicated by the storage access profile comprises a volume snapshot generated in response to a client request.

13. The method as recited in claim 6, further comprising performing, by the one or more computing devices:
storing a record of a determination that an I/O request generated during the particular phase could not be satisfied by data pre-loaded in accordance with the storage access profile; and
modifying the storage access profile based at least in part on the record.

14. The method as recited in claim 6, further comprising performing, by the one or more computing devices:
pre-loading at least a portion of a block-level storage volume at a local storage device of a virtualization host at which a different compute instance is implemented, wherein said pre-loading comprises transferring at least a portion of an object from the storage repository service to the local storage device in accordance with the storage access profile.

15. The method as recited in claim 6, further comprising performing, by the one or more computing devices:
monitoring one or more resource consumption metrics at the provider network;
identifying, from a candidate pre-load data set indicated in the storage access profile, in accordance with the one or more resource consumption metrics, a particular data unit to be transferred from the storage repository service, and a different data unit not to be transferred from the storage repository service, and
transferring the particular data unit from the storage repository service to the block storage service.

16. A non-transitory computer-accessible storage medium storing program instructions that when executed on one or more processors:
obtain, from a collection of storage access profiles generated based at least in part on monitoring, during a phase of program execution at a particular compute instance, block-level data transfers from a storage repository service of a provider network to a block storage service of the provider network, a particular storage access profile corresponding to the phase of program execution, wherein the phase of program execution is anticipated at a different compute instance;
identify, using the particular storage access profile, at least a portion of an object of the storage repository service to be pre-loaded to populate a block-level storage volume to be accessed via one or more block-level data transfers from the different compute instance; and
initiate a transfer of at least a portion of the object from the storage repository service to populate the block-level storage volume.

17. The non-transitory computer-accessible storage medium as recited in claim 16, wherein the storage repository service comprises a key-value store accessible via a web-services interface.

18. The non-transitory computer-accessible storage medium as recited in claim 16, wherein the instructions when executed on the one or more processors:
select the phase of program execution for generation of the particular storage access profile based at least in part on one or more of: (a) a determination that the phase comprises a sequence of I/O requests expected to be repeated, with a probability above a threshold level, by one or more other compute instances, (b) a determination of performance costs associated with one or more data transfers from the storage repository service to satisfy I/O requests generated during the phase, or (c) a profiling request; and
generate the particular storage access profile.

19. The non-transitory computer-accessible storage medium as recited in claim 16, wherein the object at the storage repository service comprises a volume snapshot generated in response to a client request.

20. The non-transitory computer-accessible storage medium as recited in claim 16, wherein the instructions when executed on the one or more processors:
in response to a determination that an I/O request from the compute instance during the phase of program execution cannot be satisfied from the transferred portion of the object,
store a record of the determination that the I/O request could not be satisfied; and
modify the particular storage access profile based at least in part on the record.

* * * * *